United States Patent Office 3,495,962
Patented Feb. 17, 1970

3,495,962
METHOD OF UTILIZING GRAPHITE-CONTAINING OIL-IN-WATER LUBRICANTS FOR GLASS MOLDING
James H. Norton, Corunna, Ontario, Canada, and Anthony Lagani, Jr., Newark, N.J., assignors to Esso Research and Engineering Company, a corporation of Delaware
No Drawing. Filed June 14, 1967, Ser. No. 645,885
Int. Cl. C03b 39/00
U.S. Cl. 65—26                                    9 Claims

ABSTRACT OF THE DISCLOSURE

Graphite-containing oil-in-water lubricants giving improved performance in glass molding operations are prepared from water and an oil concentrate comprising a high molecular weight petroleum oil bright stock, a hydrocarbon solvent and an emulsifier system. This concentrate contains 0.1–0.8 weight percent colloidal graphite, 70–90 weight percent of a mixture of the bright stock and the hydrocarbon solvent with the solvent accounting for 10–40 weight percent percent of the mixture, and the balance of the graphite-containing concentrate being the emulsifier system. A preferred emulsifier system is comprised of: (a) a $C_2$–$C_3$ olefin oxide derivative of a compound selected from the group consisting of a fatty acid partial ester of an aliphatic polyhydric alcohol, a fatty alcohol, a fatty acid, an aliphatic amine, an alkyl phenol and mixtures thereof, (b) a neutralized high molecular weight organic acid, and (c) a coupling agent.

BACKGROUND OF THE INVENTION

Field of the invention

This invention relates to compositions which are suitable for lubricating the molds used in forming shaped articles of glass. More particularly, this invention relates to oil-in-water emulsions formed from high molecular weight petroleum oils and colloidal graphite solids, which emulsions are useful for lubricating the metal molds (e.g., iron molds) used for molding glass. These lubricants prevent the molten glass from sticking to the metal mold.

Description of the prior art

In one type of molding glass bottles, containers, etc., gobs of molten glass at temperatures of about 1800° F. to 2200° F. are dropped into a closed split cavity iron mold which is usually maintained at a temperature of about 970° F. The iron mold is then inverted and compressed air is blown into the mold to spread the molten glass along the confines of the mold and to thus shape the glass. The two halves of the mold are then separated and the hot glass article is removed. Next, the mold is closed, its interior is sprayed with lubricant and the process is repeated. In another type of molding, a parison is formed in one mold and then transferred to another mold for final shaping. In either type of molding, the lubricant is usually sprayed into the mold through a spray head spraying over a 360° circle, which spray head is inserted into the depth of the closed mold and then withdrawn while spraying. At present, hand swabbing of portions of the mold is often necessary to supplement the atuomatic application of the lubricant described above. Thus, when the mold machine operator detects that part of the mold is sticking to the glass, he will manually swab that portion of the mold with additional lubricant. A typical operation will involve hand swabbing every quarter or half hour. There is therefore a need for better lubricants than now exist to prevent sticking of the molten glass to the molds to thereby prevent slowdowns and hand swabbing, to reduce the number of rejects, minimize fire hazards, etc.

In general, any lubricant to be used in glass molds should have a boiling point high enough that intolerable amounts of the lubricant will not evaporate from the mold before the glass is added; it should not be decomposed to leave thick deposits on the mold surface; and it should have the necessary lubricating ability, including the ability to wet the mold and wet the glass. Ideally, such lubricants should be relatively inexpensive, and be easily transported from one location to another, e.g., from the manufacturer to the consumer. While many materials have the necessary boiling point and thermal stability, few have the additional ability to adequately lubricate a glass mold. For example, polyphenyl ethers are well known for their high boiling points and thermal stability, but they completely fail to effectively lubricate glass molds. Moreover, many materials which have adequate lubricating characteristics are found to have inherent deficiencies. For example, graphite has the disadvantage that it is ordinarily messy to apply and usually a considerable number of pieces of glassware have to be discarded because of the graphite specks left on the glass after each application. Further, graphite-mineral oil suspensions, in many instances, are found to be either too viscous (e.g., high molecular weight petroleum oil suspensions are too viscous to be sprayed directly) and/or are excessively smoky. With respect to the latter, smoke elimination may be effected by utilizing volatile solvent-oil blends but this leads to fire (e.g., when light naphtha is used) or toxicity (e.g., when a chlorinated solvent is used) hazards.

SUMMARY OF THE INVENTION

It has now been found that excellent lubricants having the desired characteristics mentioned above for glass molding can be formed by emulsifying graphite particles and a high molecular weight petroleum oil-hydrocarbon solvent mixture into water. Specifically, it has been found that a stable oil-in-water emulsion can be prepared by admixing a stable graphite-containing oil concentrate with 5–20 volumes of water, generally 7—12 volumes of water, e.g., 8–10 volumes of water per volume concentrate.

The oil concentrate can contain from about 0.1–0.8 wt. percent, preferably 0.2–0.5 wt. percent of colloidal graphite particles; from about 70–90 wt. percent, more usually 75–85 wt. percent, of a mixture of a high molecular weight petroleum oil and a hydrocarbon solvent (the solvent accounting for 10–40 wt. percent, preferably 15–35 wt. percent of the mixture of solvent and oil) with the balance being an emulsifying agent or surfactant combination. The minimum total amount of emulsifying agent that can be used in the concentrate is about 10 wt. percent (based on total weight of the oil concentrate). It is preferred, however, to use at least 20 total wt. percent of the emulsifying agent or surfactant combination, e.g., 20–30 wt. percent. In general, at least 0.5 wt. percent of each of the individual surfactant ingredients employed will be present in the concentrate (based on total weight of the oil concentrate). Preferably, the oil concentrate will contain at least 2 wt. percent of each material employed in the surfactant combination, e.g., 2–8 wt. percent.

The novel products of the present invention are economically competitive with presently used aqueous emulsions, and offer significant performance advantages. Moreover, the use of the graphite-containing emulsions of this invention eliminates or minimizes many of the problems associated with the use of solid graphite per se or in combination with oils. Thus, the instant oil-in-water emulsions, when used in glass molding operations, neither produce significant amounts of smoke nor present fire or toxicity hazards. More importantly, the instant emulsions are found to substantially increase the blank life in glass molding operations, i.e., the emulsions significantly reduce the build-up of deposits which necessitate shutdown for cleaning and replacing of blanks.

The high molecular weight petroleum oils most suited for use according to the present invention are those oils having an average molecular weight of about 500 to 900, more usually from 550 to 800, and preferably from 575 to 700. In this respect, bright stocks are especially desirable and have outstanding properties. These preferred petroleum oils are derived from the de-waxed and de-asphalted residuum of any crude oil. These bright stocks will ordinarily have a viscosity at 210° F. of from about 120 to 300 SUS (Saybolt Universal seconds). A typical preferred bright stock will have a boiling point above the molding temperature, e.g., a boiling range at atmospheric pressure of from about 900° F. (5 volume percent distilled over) to 1100° F. at 50–75 volume percent distilled over. These representative boiling points are measured according to ASTM method D–1160 at 1 torr and then converted to boiling points at atmospheric pressure. Three preferred bright stocks were found to have the following properties:

The fatty acid partial esters include the $C_8$–$C_{24}$ fatty acid partial esters of aliphatic polyhydric alcohols having about 3 to 12, e.g., 3 to 8, carbon atoms, and about 2 to 8, e.g., 3 to 6, hydroxy groups per molecule. The mono-, di-, and tri-esters of sorbitol are especially useful, with the mono- and tri-esters being the more readily available in commercial quantities. Esters of stearic, oleic, lauric and palmitic acids are especially desirable.

Specific examples of partial esters will include: glyceryl monooleate, pentaerythritol monooleate, sorbitan monooleate, the dioleates of sorbitan, mannitan, pentaerythritol, and related polyhydric alcohols, the corresponding partial stearic and palmitic acid esters of these alcohols, and partial esters of these alcohols made from mixtures of these fatty acids. The ethylene oxide derivatives are preferred, especially those containing from 2–30, more preferably 4–20 moles of oxide per mole of ester. These preferred epoxide derivatives are known commercially as polyoxyethylene sorbitan fatty acid esters. Many are marketed under the trade name "Tween." Typical materials are the reaction products of sorbitan mono- and tri-stearate with from 4–14 moles of ethylene oxide, and the reaction product of sorbitan mono-laurate with 4–14

TABLE I.—PROPERTIES OF THREE PREFERRED BRIGHT STOCKS

|  | Bright Stock A (Coray 200) | Bright Stock B (2503 Bright Stock) | Bright Stock C (2502 Bright Stock) |
| --- | --- | --- | --- |
| Average molecular weight | 693 | 616 | 580 |
| Viscosity at 210° F., SUS | 208 | 154 | 152 |
| Flash point, open cup, ° F | 580 | 563 | 575 |
| ASTM pour point, ° F | +15 | +15 | +15 |
| Viscosity Index | 79.5 | 101.5 | 100 |
| Carbon residue | 0.82 | 0.70 | 0.60 |
| ASTM distillation, ° F. (converted from 1 torr): |  |  |  |
| IBP | 750 | 877 | 860 |
| 5% | 923 | 943 | 920 |
| 50% | 1,060 | 1,070 | 1,065 |
|  | 74% at 1,117 | 65% at 1,110 | 65% at 1,100 |

All oils shown in Table I cracked on further heating.

Solvents which can be used in accordance with the present invention include, but are not limited to, hydrocarbon solvents such as virgin naphthas from paraffinic crudes, refined naphthas of paraffinic or naphthenic nature, normal and branched chain paraffins, aromatics, alkylated aromatics, etc. Preferably, the flash point of the solvent chosen is above 100° F. Preferably, the solvent will have a low viscosity such that not over 40 wt. percent solvent is required to give a viscosity of less than 500 SUS at 100° F. for the mixture of solvent and oil. Preferred solvents are solvent naphthas (e.g., Varsol #3, an $SO_2$ extracted virgin naphtha), solvent alkylates (e.g., ISOPAR G, an isobutane alkylate), aromatic solvents (e.g., Solvesso 100, a mixed aromatic solvent with an atmospheric boiling range of about 320° to 360° F.), heavy aromatic naphtha, and the like.

These solvents serve to facilitate handling of the high molecular weight oils which would otherwise be too difficult to handle.

The emulsifying agent or surfactant combination used to form the emulsions should be one which does not cause undesirable residue to build up in the mold as the repeated applications of lubricant are burned off. Of course, the emulsifying agent must also be able to maintain a stable graphite-containing oil-in-water emulsion. Many emulsifying agents have been found to be useful herein.

One type of emulsifier which was found particularly effective is a surfactant combination comprising (a) a $C_2$–$C_3$ olefin oxide derivative of a compound selected from the group consisting of a fatty acid partial ester of an aliphatic polyhydric alcohol, a fatty alcohol, a fatty acid, an aliphatic amine, an alkyl phenol and mixtures thereof, (b) a neutralized high molecular weight organic acid, and (c) a coupling agent.

moles of ethylene oxide. If desired, mixtures of these materials may be used.

The fatty acids reacted with the $C_2$–$C_3$ olefin oxide include the substantially linear, aliphatic, monobasic acids containing from about 10 to about 20 carbon atoms. Such acids include, among others, lauric, palmitic, stearic and oleic acids and the like. Ethylene oxide derivatives of stearic and oleic acids are especially preferred.

The fatty alcohol derivatives of this invention include those products obtained from the substantially linear, aliphatic, monohydric alcohols containing from about 10 to about 20 carbon atoms. Specific examples of these alcohols include, among others, n-dodecyl, n-tetradecyl, n-cetyl, n-octadecyl, oleyl alcohols and the like. The ethoxylated derivatives of the normal $C_{16}$–$C_{18}$ primary alcohols are especially preferred.

The aliphatic amine derivatives of this invention include the products prepared from the substantially linear, aliphatic amines having from about 10 to about 20 carbon atoms. Non-limiting examples of these materials include laurylamine, cetylamine, octadecylamine, eicosylamine, oleylamine and the like. The ethoxylated derivatives of the normal $C_{16}$–$C_{18}$ primary amines are preferred.

The alkyl phenols which are reacted with ethylene oxide or propylene oxide include the mono- or di-alkyl phenols having from about 8 to about 12 carbon atoms in the alkyl group. Specific examples include, among others, p-octyl phenol, nonyl phenol, di-nonyl phenol, p-dodecyl phenol, di-dodecyl phenol and the like. Ethoxylated p-nonyl phenols have been found to be especially effective.

The present invention is not known to be dependent in any way on the method of preparing the aforedescribed alkoxylated derivatives. Methods for their prepartion are well known to those skilled in the art. Consequently, such materials may be used regardless of their source.

The neutralized high molecular weight organic acids are of the type commonly used as detergents in motor oils. They are based on polymers of $C_2$–$C_5$ olefins wherein the polymer has molecular weight (Staudinger) of from 400–3000, more usually from 700–1400. The acid forms of these polymers are obtained by reaction of the polymers with $P_2S_5$ or with maleic anhydride, etc., as is known in the lubricating art. $P_2S_5$ treated polybutene and polybutenyl succinic anhydride (or acid) are preferred. These materials are well known in the lubricating art. See, for example, U.S. Nos. 3,018,247, 3,018,250, and 3,018,291, as well as British No. 922,831 (all incorporated herein by reference). Since the methods of forming the polymers, the acid derivatives thereof, and subsequent neutralization of the acid derivatives are all well known in the art and, further, since the choice of such methods is immaterial to the present invention, any of the numerous processes available can be used therefor. Neutralization of the acid derivatives may be accomplished with conventional bases (e.g., sodium hydroxide, potassium hydroxide, etc.) or with amines (e.g., triethanolamine) and such neutralization may be done prior to adding the acid derivatives to the high molecular weight oil or it may be done in situ in the oil. Many amine derivatives of monoalkenyl succinic anhydride are commercially available and are well suited for use according to this invention. Suitable amine neutralizing agents are adequately described in the prior art. Preferred amine neutralizing agents are the alkyl and alkanol amines (e.g., triethanol amine) and the aliphatic polyamines such as those having the formula $NH_2(CH_2)_n[NH(CH_2)_n]_mNH_2$ wherein $n$ is 2 to 3 and $m$ is a number from 0 to 10 (e.g., diethylenetriamine, tetraethylenepentamine, dipropylenetriamine, etc.). The ethylene diamines containing 1–5 ethylene residues are especially useful. Mixtures of amines may be used. Ammonia may also be used.

The coupling agents which are found useful herein include those materials which serve to create disorder in the surfactant monolayer, thereby causing the surfactants to become more effective. It appears that a coupling agent creates gaps in the surfactant monolayer, which gaps are then filled with water and/or oil. Cyclohexanol and/or water are extremely effective as coupling agents.

Other coupling agents found useful include, among others, $C_4$–$C_8$ tertiary alcohols (e.g., t-butanol and t-amyl alcohol), lower alkyl (e.g., $C_1$–$C_4$ alkyl) cyclohexanols, alkyl (e.g., $C_8$–$C_{12}$ alkyl) phenols, isopropyl alcohol, $C_8$ oxo alcohol and glycerol. Mixtures of these coupling agents may also be used.

It is desirable (but not necessary) to supplement the aforedescribed emulsifying agent or surfactant combination with certain additional surfactants so as to improve or stabilize the hydrophilic/lipophilic balance (HLB). The optimum HLB is about 6–14, e.g., about 10–12. The HLB is defined in the art as twenty times the ratio of the water-wetted (hydrophilic) weight in the surfactant molecule to the total molecular weight. See Griffin, W. C., Jour. Soc. Cosmet. Chemists, vol. 1, page 311 (1949). Thus, a surfactant containing 30% hydrophilic groups (e.g., polyoxyethylene) would have an HLB of 6.

The classes of additional surfactants that may be used are:

Class 1

This class includes the high HLB materials such as triethanolamine (which is essentially 20 HLB). High HLB amines, e.g., triethanolamine, can serve to both neutralize the acid derivatives of the olefin polymers and also to act as supplemental surfactants. As previously indicated, the neutralization of the acid polymers can be accomplished with conventional bases, e.g., sodium or potassium hydroxide, but the results are less satisfactory since those bases are ordinarily used in the form of their water solutions and also produce water as a by-product of the neutralization. No neutralization is done in situ, this water tends to separate and/or causes the resulting oil concentrate to be cloudy. The amines are free from these problems and can be used effectively in situ. Presumably, the neutralization could be done with any non-volatile alkyl or alkylol amine (but not aryl amines).

The average HLB can also be raised by adding additional (the same or different) high HLB surfactant. Thus, it is possible to:

(a) use an amine (preferably one having a boiling point at atmospheric pressure of over 300° F.) in an amount sufficient to both neutralize free polymer acid and help raise the HLB. Suitable amines include ethanolamine, diethanolamine, triethanolamine; the corresponding propanol and butanol amines; mixed ethanol and propanol amines; etc., or (b) use a base (e.g., alkali metal or alkaline earth metal base) as a neutralizing agent and then adding a high HLB surfactant (e.g., non-volatile amine) to raise the average HLB.

Class 2

This class includes the surfactants having a medium HLB (e.g., HLB of 6–14) and medium molecular weight. These surfactants (usually petroleum sulfonates) are used to increase the total surfactant content of the oil concentrate without losing the desired HLB. The need for surfactants of this class is not critical, but their use is preferred so as to stabilize the HLB balance. Suitable medium HLB and medium molecular weight sulfonates include the petroleum sulfonates having an average molecular weight of, for example 400 to 520. One desirable sulfonate of this type is a sodium petroleum sulfonate having an average molecular weight of 500.

The graphite particles which are suspended in the oil-in-water emulsion of this invention generally are colloidal in size. Broadly, the particle may be as large as 10 microns. It is preferred, however, that the graphites have a particle size less than 3 microns, e.g., 0.5 to 1.5 microns.

Various other additives may optionally be added to the oil concentrates of this invention in varying amounts. Examples of such additives include lubricants such as molybdenum disulfide, boron nitride, and silicon-containing materials; oxidation inhibitors such as 2,6-ditertiary butyl 4-methyl phenol; additives for prevention of bacteria or fungus growth such as trihydromethyl-nitromethane; etc.

DESCRIPTION OF THE PREFERRED EMBODIMENTS

Example 1

A preferred oil concentrate having the following composition was prepared by simple mixing of the ingredients at about 100° F.

| Composition: | Volume percent |
|---|---|
| 2502 solvent bright stock [1] | 62.2 |
| Escomat 45 [2] | 19.5 |
| Polyoxyethylene sorbitan trioleate [3] | 4.5 |
| Polyoxyethylene sorbitan monooleate [4] | 4.5 |
| Polyoxyethylated fatty acid [5] | 4.7 |
| Neutralized $P_2S_5$ treated polybutene [6] | 4.6 |
| Water | 2.0 |
| | 100.0 |

[1] Described in Table I.
[2] Aromatic solvent (88% aromatics) having a gravity API of 17.0, a flash point (TCC) of 160° F., a viscosity of 2.3 cps. @ 77° F. and boiling within the range between about 380° to 540° F.
[3] A condensation product of 20 moles of ethylene oxide per mole of sorbitan trioleate.
[4] A condensation product of 5 moles of ethylene oxide per mole of sorbitan monooleate.
[5] A condensation product of 6 moles of ethylene oxide per mole of oleic acid.
[6] A superbased mixture of $P_2S_5$ treated polybutene of 780 molecular weight and alkyl phenol; superbasing accomplished with barium oxide and carbon dioxide.

The above oil concentrate had a gravity API of 21.3 and a viscosity at 100° F. of 380 SUS. Upon standing at room temperature for 48 hours the product remained clear with no visible separation detectable.

Example 2

In this example, 97 volume parts of the oil concentrate of Example 1 was admixed with 3 volume parts of Oildag (colloidal graphite: 10% of one micron particle size graphite dispersed in petroleum oil) to form a stable suspension of the graphite in the oil concentrate. This graphite-containing oil concentrate was mixed with tap water from Sarnia, Ontario in the water/concentrate ratios of 8/1 and 10/1. In all cases the foregoing oil-in-water emulsions remained stable (i.e., no pronounced creaming or separation) for a period of at least 24 hours.

Example 3

One part by volume of the graphite-containing oil concentrate of Example 2 was mixed with 8 parts by volume of water and tested in an automatic, high speed, Owens Illinois I.S. (individual section) machine including an iron parison mold (a blank mold) and an iron final mold, said machine operating on a press and blow cycle, and making baby food jars. Briefly described, the machine operated as follows: The spray head enters the parison mold and sprays the interior of the mold as it withdraws. After this the glass gob at a temperature of about 2000° F. drops into the iron parison mold which is at a temperature of about 950° F. A baffle closes the opening in the parison mold through which said gob drops in, and a mandrel moves up into the parison mold from the bottom of said mold and contacts the glass and presses the glass against the sides of the mold to form the blank. The glass blank is then withdrawn from the parison mold, inverted and transferred into the previously lubricated final mold, i.e., the blow mold, where the hot blank (about 1650° F.) is blown to fit the confines of the split cavity final mold having a temperature of about 850° F. after which the final mold opens and the blown bottle (temperature about 1200° F.) is removed. Both the parison mold and the final mold were sprayed every time before the glass entered the mold by a spray head entering the mold and then spraying the mold with the lubricant as the spray head retracts from the mold. The results of this test showed that the lubricant of this invention increased the blank life from 8 hours to 16 hours or more. In addition, the manual graphite swabbing cycle employed was increased from 10 minutes to 30 minutes or more.

What is claimed is:

1. In a method of glass molding wherein molten glass, or a hot glass parison, is placed in contact with a lubricant coated hot iron mold surface and is shaped against said surface, followed by removal from said contact, the improvement wherein said lubricant comprises an oil-in-water emulsion containing from about 5 to about 20 parts by volume of water per volume of a graphite-containing concentrate comprised of: (a) 0.1–0.8 wet. percent colloidal graphite, (b) 70–90 wt. percent of mixture of petroleum bright stock and hydrocarbon solvent, said solvent accounting for 10–40 wt. percent of said mixture, and (c) the balance of said graphite-containing concentrate being a surfactant comprising at least 0.5 wt. percent of each of (1) an alkoxylated material which is the reaction product of 2–30 moles of $C_2$–$C_3$ olefin oxide per mole of a compound selected from the group consisting of $C_8$–$C_{24}$ fatty acid partial ester of a $C_3$–$C_{12}$ aliphatic polyhydric alcohol, a $C_{10}$–$C_{20}$ fatty alcohol, a $C_{10}$–$C_{20}$ fatty acid, a $C_{10}$–$C_{20}$ aliphatic amine, a $C_8$–$C_{12}$ alkyl phenol and mixtures thereof, (2) a neutralized polymeric acid selected from the group consisting of neutralized phosphosulfurized polyolefin and neutralized polyalkenyl succinic acid prepared from $C_2$–$C_5$ olefin polymerized to a molecular weight of 400–3,000 and (3) a coupling agent, said weight percents being based upon the total weight of said graphite-containing concentrate.

2. In a method according to claim 1, the amount of said alkoxylated material and said neutralized polymeric acid each being at least 2.0 wt. percent.

3. In a method according to claim 2, the coupling agent being selected from the group consisting of water, cyclohexanol, lower alkyl cyclohexanol, $C_4$–$C_8$ tertiary alcohol, alkylphenol, $C_8$ Oxo alcohol, isopropyl alcohol, glycerol, and mixtures thereof, the amount of coupling agent being at least 1.0 wt. percent.

4. In a method according to claim 3 wherein the alkoxylated material is the reaction product of ethylene oxide with a compound selected from the group consisting of a partial ester of sorbitol, stearic acid, oleic acid, $C_{16}$–$C_{18}$ primary alcohol, $C_{16}$–$C_{18}$ primary amine nonyl phenol and combinations thereof and wherein the coupling agent is selected from the group consisting of water, cyclohexanol and combinations thereof.

5. In a method according to claim 1, the graphite-containing concentrate being comprised of (a) 0.2–0.5 wt. percent colloidal graphite, (b) 70–85 wt. percent of a mixture of a petroleum bright stock having an average molecular weight of about 500–900, and a viscosity at 210° F. of about 120–300 SUS, and hydrocarbon solvent, said solvent accounting for 15–35 wt. percent of said mixture, and (c) the balance of said graphite-containing concentrate being a surfactant combination comprising 2–10 wt. percent of each of the reaction products of 4–20 moles of $C_2$–$C_3$ olefin oxide per mole of $C_{16}$–$C_{18}$ fatty acid, a $C_{16}$–$C_{18}$ fatty acid mono-ester of sorbitol and a $C_{16}$–$C_{18}$ fatty acid tri-ester of sorbitol; 2–10 wt. percent of a neutralized $P_2S_5$ treated polybutene; and at least 1 wt. percent of a coupling agent selected from the group consisting of water, cyclohexanol, lower alkyl cyclohexanol, $C_4$–$C_8$ tertiary alcohol, alkyl phenol, $C_8$ Oxo alcohol, isopropyl alcohol, glycerol, and mixtures thereof.

6. In a method according to claim 5, the $C_2$–$C_3$ olefin oxide being ethylene oxide, the fatty acid being oleic acid, the mono-ester of sorbitol being sorbitan monooleate, the triester of sorbitol being sorbitan trioleate and the coupling agent being water or cyclohexanol or combinations thereof.

7. In a method according to claim 5, the surfactant combination comprising 4–6 wt. percent of each of polyoxyethylene sorbitan trioleate, polyoxyethylene sorbitan monooleate, and a neutralized $P_2S_5$ treated polybutene of 400–3,000 mol. weight and about 2.0 wt. percent of a coupling agent selected from the group consisting of water, cyclohexanol, glycerol, isopropanol, and mixtures thereof.

8. In a method according to claim 7, the coupling agent being water and the polybutene having a molecular weight within the range between 700 and 1,400.

9. In a method according to claim 5, the hydrocarbon solvent being selected from the group consisting of solvent naphthas, solvent alkylates, aromatic solvents and heavy aromatic naphtha.

References Cited

UNITED STATES PATENTS

| | | | |
|---|---|---|---|
| 2,784,108 | 3/1957 | Cupper | 106—38.22 |
| 2,932,576 | 4/1960 | Vierk et al. | 252—29 |
| 3,052,629 | 9/1962 | Morrow et al. | 65—24 |
| 3,213,024 | 10/1965 | Blake et al. | 252—22 |

S. LEON BASHORE, Primary Examiner

E. R. FREEDMAN, Assistant Examiner

U.S. Cl. X.R.

65—24, 169, 170; 106—38.24, 38.7; 117—134; 252—22, 29